United States Patent
Leef et al.

(10) Patent No.: US 9,984,193 B1
(45) Date of Patent: *May 29, 2018

(54) SYSTEM TO COMBAT DESIGN-TIME VULNERABILITY

(71) Applicant: Mentor Graphics Corporation, Wilsonville, OR (US)

(72) Inventors: Serge Leef, Portland, OR (US); Ahmed Badran, Canby, OR (US); Sudhir Kadkade, Lake Oswego, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 200 days.

This patent is subject to a terminal disclaimer.

(21) Appl. No.: 14/589,751

(22) Filed: Jan. 5, 2015

Related U.S. Application Data

(63) Continuation of application No. 14/168,912, filed on Jan. 30, 2014, now Pat. No. 8,930,878.

(51) Int. Cl.
*G06F 17/50* (2006.01)

(52) U.S. Cl.
CPC ...... *G06F 17/5081* (2013.01); *G06F 17/5077* (2013.01)

(58) Field of Classification Search
CPC .......................... G06F 17/5036; G06F 17/5022
USPC .......................................................... 716/136
See application file for complete search history.

(56) References Cited

U.S. PATENT DOCUMENTS

2006/0075374 A1* 4/2006 McElvain ........... G06F 17/5045
716/116

* cited by examiner

*Primary Examiner* — Suresh Memula
(74) *Attorney, Agent, or Firm* — Mentor Graphics Corporation

(57) ABSTRACT

This application discloses a computing system implementing tools and mechanisms that can incorporate a security co-processor into a circuit design modeling an electronic device. The tools and mechanisms can configure the security co-processor to monitor at least a portion of the electronic device. The tools and mechanisms can generate at least one security action for the security co-processor to initiate when the security co-processor monitors the electronic device failing to conform to rules in a rules database.

20 Claims, 7 Drawing Sheets

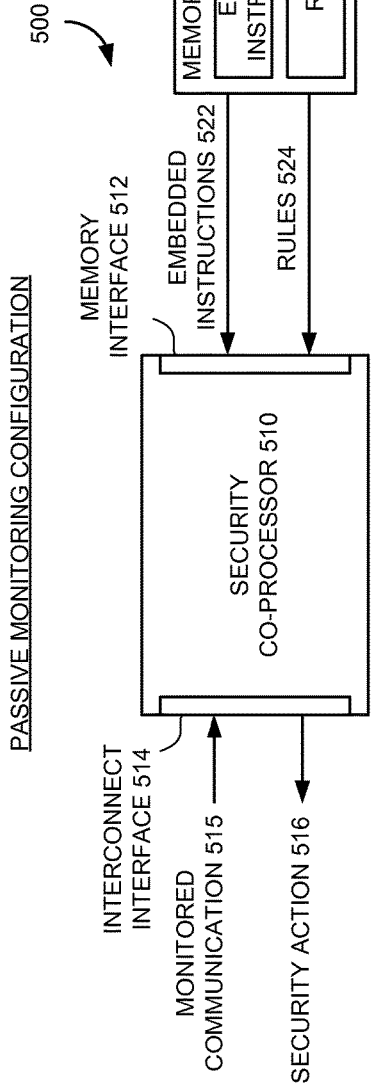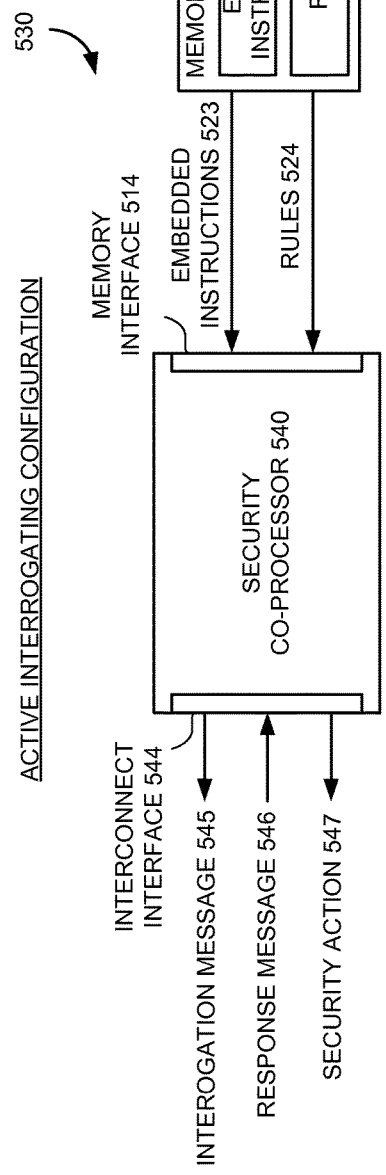

SYSTEM TO COMBAT DESIGN-TIME VULNERABILITY

RELATED APPLICATION

This application is a continuation of and claims priority to U.S. patent application Ser. No. 14/168,912, filed Jan. 30, 2014, which is incorporated herein by reference.

TECHNICAL FIELD

This application is generally related to electronic design automation and, more specifically, to a system to combat design-time vulnerability.

BACKGROUND

Microdevices, such as integrated microcircuits and microelectromechanical systems (MEMS), are used in a variety of products, from automobiles to microwaves to personal computers. Designing and fabricating microdevices typically involves many steps, known as a "design flow." The particular steps of a design flow often are dependent upon the type of microcircuit, its complexity, the design team, and the microdevice fabricator or foundry that will manufacture the microcircuit. Typically, software and hardware "tools" verify the design at various stages of the design flow by running software simulators and/or hardware emulators, and errors in the design are corrected or the design is otherwise improved.

The "design flow" typically begins by transforming a specification of a new circuit into a logical design, sometimes referred to as a register transfer level (RTL) description of the circuit. With this logical design, the circuit can be described in terms of both the exchange of signals between hardware registers and the logical operations that can be performed on those signals. The logical design typically employs a Hardware Design Language (HDL), such as the Very high speed integrated circuit Hardware Design Language (VHDL). Due to the time and effort it takes to create and verify original HDL code for a new circuit, many developers utilize design building blocks, often referred to as design IP (Intellectual Property), which can describe a component or other electrical subsystem that may be incorporated into the logical design. These developers often generate their logical design by introducing instances of different design IP into the logical design and then interconnecting them to implement the functionality in the specification of the new circuit.

Since most design IP comes from third-party vendors, these developers typically evaluate the design IP through a series of tests to ensure that the design IP implements its intended functionality prior to utilizing the design IP in the logical design. For example, when design IP implements a Peripheral Component Interconnect (PCI) communication system, the series of tests can verify that the design IP implements a PCI protocol accurately. Although this design IP verification strategy can help developers can find flaws in the intended functionality of design IP, it often fails to uncover illegal operations or unintended functionality that the design IP may implement.

SUMMARY

This application discloses a computing system implementing tools and mechanisms that can incorporate a security co-processor into a circuit design modeling an electronic device. The tools and mechanisms can configure the security co-processor to monitor at least a portion of the electronic device, and generate at least one security action for the security co-processor to initiate when the security co-processor monitors the electronic device failing to conform to rules in a rules database.

DESCRIPTION OF THE DRAWINGS

FIGS. 5A and 5B illustrate example implementations of a security co-processing system according to various embodiments of the invention.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads.

Figure 1:
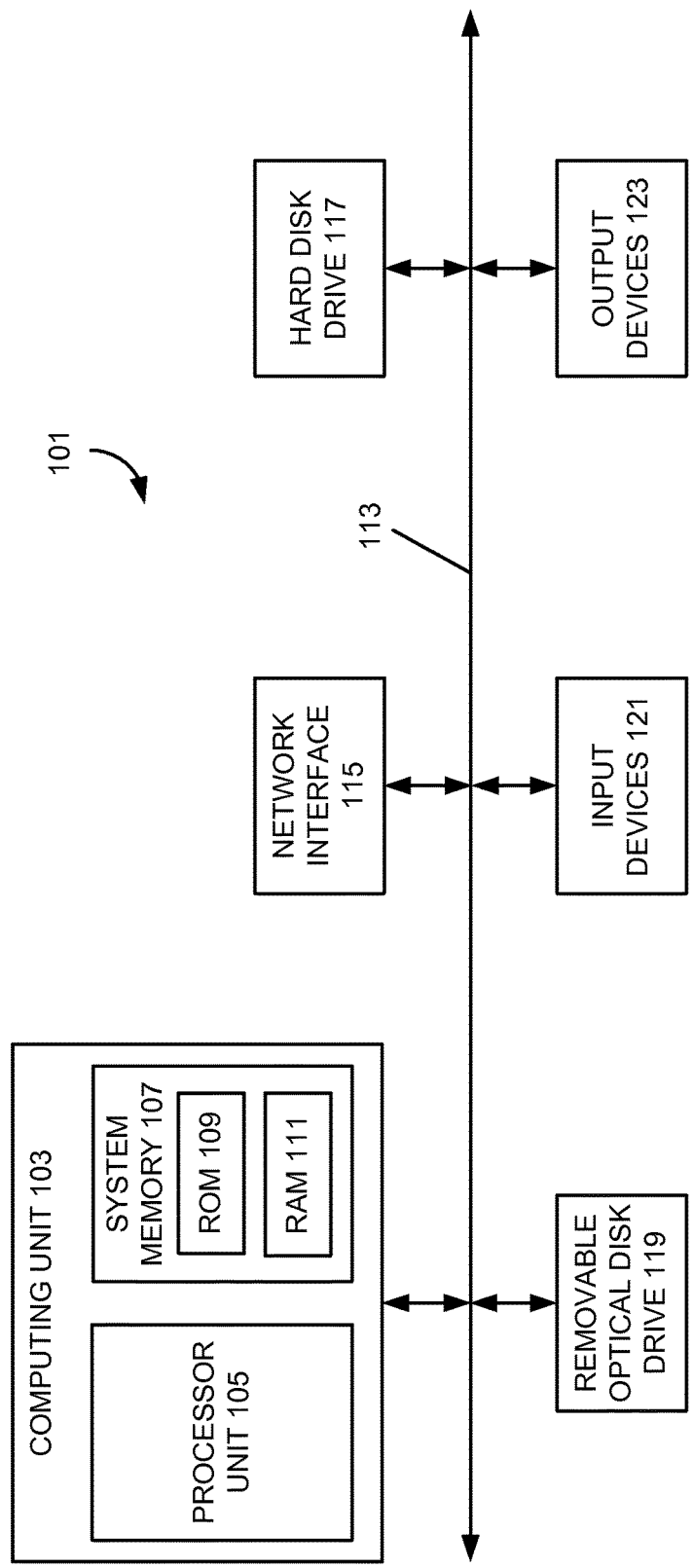
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
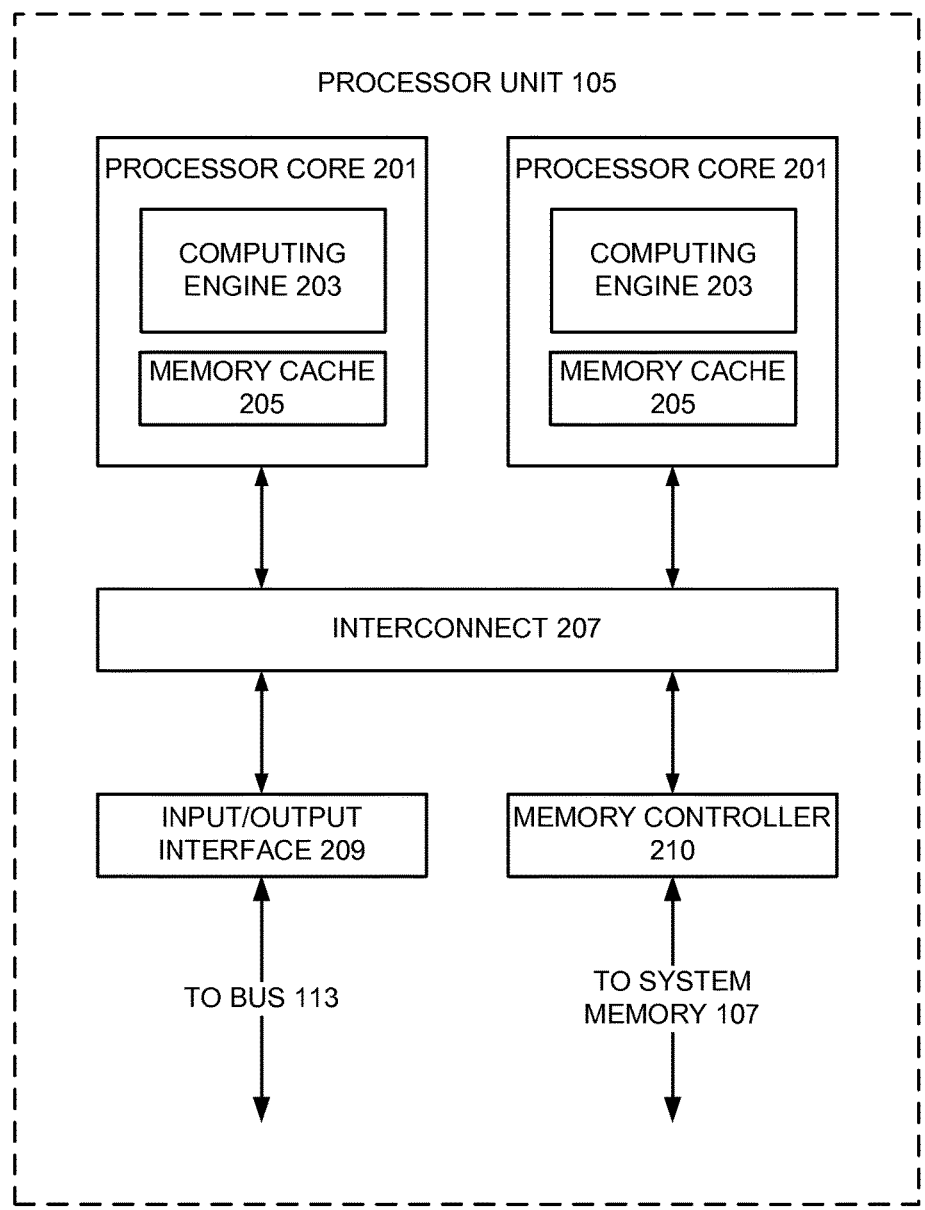

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Illustrative Security Co-Processing System Implementations

Figure 3:
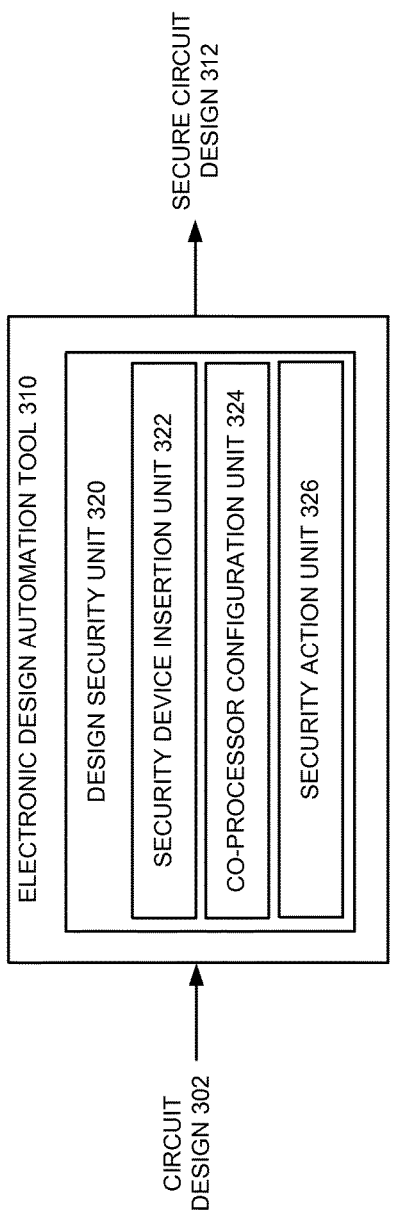
FIG. 3 illustrates an example of an electronic design automation tool that can incorporate at least one security co-processing system into a circuit design according to various embodiments of the invention.

FIG. 3 illustrates an example of an electronic design automation tool 310 that can incorporate at least one security co-processing system into a circuit design 302 according to various embodiments of the invention. Referring to FIG. 3, the electronic design automation tool 310 can receive the circuit design 302, which can describe an electronic device at one or more different levels of abstraction. For example, the circuit design 302 can model the electronic device at a register transfer level (RTL), a gate-level, a transistor-level, or the like. At the register transfer level, the circuit design 302 can model the electronic device both in terms of an exchange of data signals between components in the electronic device, such as hardware registers, flip-flops, combinational logic, or the like, and in terms of logical operations that can be performed on the data signals in the electronic device, for example, with code in a hardware description language (HDL), such as Verilog, Very high speed integrated circuit Hardware Design Language (VHDL), SystemC, or the like. At the gate-level, the circuit design 302 can model the electronic device as a network of devices, for example, in a gate-level netlist. At the transistor-level, the circuit design 302 can model the electronic device as a network of transistors, for example, with a Simulation Program with Integrated Circuit Emphasis (SPICE) programming language. Although FIG. 3 shows the electronic design automation tool 310 receiving the circuit design 302, in some embodiments, the electronic design automation tool 310 can develop the circuit design 302 internally.

The electronic design automation tool 310 can include a design security unit 320 to modify the circuit design 302 to incorporate hardware-based security features, such as a security co-processing system, and output the modified circuit design as a secure circuit design 312. Electronic devices manufactured according to the secured circuit design 312 can be secured from unauthorized or illegal operations by components in the electronic devices, as the security co-processing system can identify when unauthorized or illegal operations occur and, in response, initiate one or more security actions.

The design security unit 320 can include a security device insertion unit 322 to incorporate a security co-processing system in the circuit design 302, for example, coupled to a component or sub-system in the circuit design 302. In some embodiments, the security co-processing system can be coupled to an interconnect, such as a bus, group of busses, a interconnect fabric, or the like, in the circuit design 302. The security co-processing system can include a security co-processor and a memory system to store embedded instructions that, when executed by the security co-processor, can cause the security co-processor to monitor the component or sub-system in the circuit design 302, compare the monitored activity to a configurable set of rules, and selectively initiate one or more security actions when the security co-processor monitors the electronic device operating in a way that fails to conform with the rules. In some embodiments, the embedded instructions can be combined with the rules, for example, as rules that may be executable by the security co-processor.

The design security unit 320 can include a co-processor configuration unit 324 to generate the embedded instructions or other software code for the security co-processing system. Some of the embedded instructions, when executed by the security co-processor, can prompt the security co-processor to monitor activity of an identified component, system, or sub-system in the electronic device. The embedded instructions can identify how the security co-processor monitors the component, system, or sub-system in the electronic device. For example, the security co-processor can monitor the component, system, or sub-system in the electronic device in several ways, such as passively monitoring communication or messaging in the electronic device or actively interrogating or prodding to identify devices or their corresponding functionality in the electronic device. Embodiments of security co-processor monitoring will be described below in greater detail.

Some of the embedded instructions, when executed by the security co-processor, can identify a location of rules to compare with the monitored activity in the electronic device. The rules can be located internally to the electronic device, for example, in a local rules database accessible by the security co-processor via a local interconnect, or in the security co-processing system itself, such as a rules database in the memory system. The rules also can be located externally to the electronic device, for example, in a rules database accessible by the security co-processor via an external interface of the electronic device.

The rules can define permissible or impermissible behavior for components or sub-systems within the electronic device. For example, the rules can identify protocols, syntax, or semantics of legal communication on an interconnect in the electronic device. The rules also can explicitly identify illegal operations or impermissible behavior on the interconnect. The rules can indicate whether components provide and receive clock signaling, enable signaling, a reset signaling, interrupts, power supplies, such as voltage or current signals, or the like, within a specification for the electronic device. The rules also can define which devices can or cannot be present in the electronic device, how they can or cannot couple or connect to other components in the electronic device, and how they respond or do not respond to various stimuli, such as request or interrogation messages. In some embodiments, the co-processor configuration unit 324 can generate the configurable set of rules for use by the security co-processing system and store them in the electronic device.

Some of the embedded instructions, when executed by the security co-processor, can cause the security co-processor to retrieve the rules from a rules database or the memory system. Some of the embedded instructions also can identify which rules in the rules database for the security co-processor to access and utilize in the electronic device. In some embodiments, the security co-processing system can store a local copy of rules in the memory system, which the security co-processor can update from the rules database, periodically, intermittently, in response to an interrupt or other message indicating new rules or rule updates are available, or the like.

Some of the embedded instructions, when executed by the security co-processor, can prompt the security co-processor to compare the monitored activity in the electronic device against the rules retrieved by the security co-processor. When monitored activity in the electronic device fails to conform to the rules retrieved by the security co-processor, the security co-processor can initiate performance of security actions, for example, as defined by a security action unit 326.

The design security unit 320 can include the security action unit 326 to define one or more security actions for the security co-processing system to initiate when the security co-processor monitors the electronic device operating in a way that fails to conform with the configurable set of rules. The security actions can range from shutting down operation of at least a portion of the electronic device down to logging the monitored activity that fails to conform with the rules. In some embodiments, the security actions can include blocking the illegal activity or issuing a security interrupt to reverse any effects of the illegal activity. The security actions can include transmitting a logged activity to an external device, such as a security server or the like, via a network interface of the electronic device. The security actions also can include prompting presentation of the logged activity, for example, via one or more input/output (I/O) devices associated with the electronic device.

Figure 4:
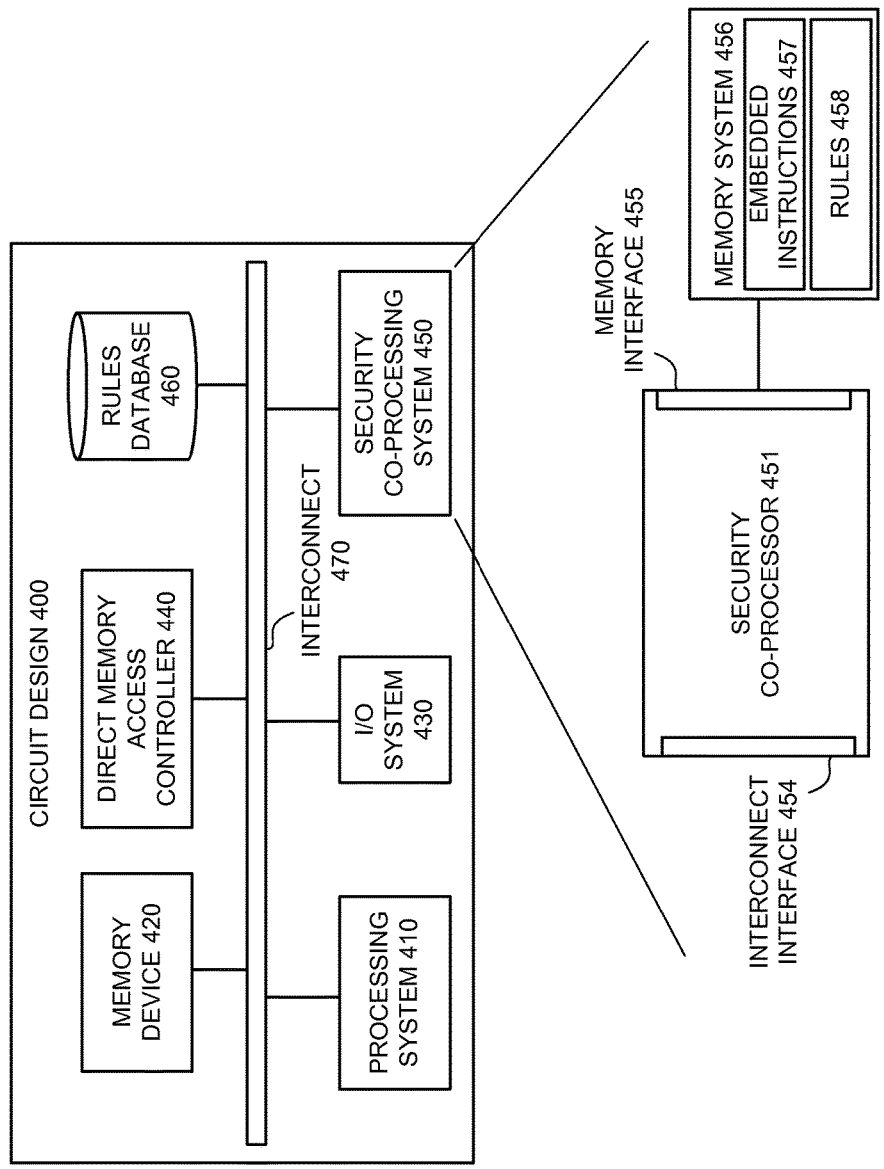
FIG. 4 illustrates an example circuit design including a security co-processing system according to various examples of the invention.

FIG. 4 illustrates an example circuit design 400 including a security co-processing system 450 according to various examples of the invention. Referring to FIG. 4, the circuit design 400 can describe an electronic device at one or more different levels of abstraction, for example, modeling the electronic device at a register transfer level (RTL), a gate-level, a transistor-level, or the like. The circuit design 400 can describe various electrical components, systems, or sub-systems interconnected to form the electronic device. For example, the descriptions of the electrical components, systems, or sub-systems can include descriptions of a processing system 410, a memory device 420, an input/output (I/O) system 430, a direct memory access (DMA) controller 440, or the like, which can be coupled via an interconnect 470. The interconnect 470 can describe a single bus, multiple busses, an interconnect fabric, or the like, which can variously couple to the electrical components, systems, or sub-systems. The descriptions of the processing system 410, the memory device 420, the input/output (I/O) system 430, and the direct memory access (DMA) controller 440 can model an exchange of messages, communication, data, or the like, with each other over the interconnect 470 in order to perform functionality in a specification for the electronic device.

The circuit design 400 can describe a security co-processing system 450 to monitor operations of the electronic device modeled by the circuit design 400, for example, by monitoring communication exchanged between the processing system 410, the memory device 420, the input/output (I/O) system 430, and the direct memory access (DMA) controller 440 over the interconnect 470. The security co-processing system 450 can compare the monitored operations of the electronic device to a set of rules 458 defining legal or illegal operations or coupling configurations in the electronic device, and initiate a security action in response to identifying operations performed by the electronic device that fail to conform to the set of rules 458.

The security co-processing system 450 can include a security co-processor 451 to implement the functionality of the security co-processing system 450, for example, in response to execution of embedded instructions 457. Although FIG. 4 shows the embedded instructions 457 as separate from the rules 458, in some embodiments, the rules 458 can be combined with the embedded instructions 457 and the security co-processor 451 can execute the combined rules to implement the security features. The security co-processor 451 can include a single processor having one or more processing cores, an array of multiple communicating processors, and/or specially configured hardware. The security co-processor 451 can include an interconnect interface 454, which can couple to the security co-processor 451 to at least a portion of the interconnect 470. The security co-processor 451 can perform various operations via the interconnect interface 454, such as monitoring communication on the interconnect 470, transmit and receive messages on the interconnect 470, for example, to interrogate devices on the interconnect 470, to retrieve rules 458 from a rules database 460, to effectuate one or more security actions, or the like.

The security co-processing system 450 can include a memory system 456 to store the embedded instructions 457 and optionally a local set of rules 458, which can couple to the security co-processor 451 via a memory interface 455. In some embodiments, the embedded instructions 457 and rules 458 can be stored externally from the security co-processing system 450, for example, in the memory device 420 or in a storage device external to the electronic device, for example, accessible via the I/O system 430 described by the circuit design 400. The rules 458 can be encrypted and compiled prior to transmission to the security processing system 450 through the electronic device. In some embodiments, the security co-processor 451, in response to execution of the embedded instructions 457, can decrypt the rules 458 for use in identifying non-conforming operations in the electronic device and initiation of security actions.

FIGS. 5A and 5B illustrate example implementations of a security co-processing system 500 according to various embodiments of the invention. Referring to FIG. 5A, the security co-processing system 500 can include a security co-processor 510 set in a passive monitoring configuration, for example, in response to embedded instructions 522 from a memory system 520 via a memory interface 520. The security co-processor 510 can include a single processor having one or more processing cores, an array of multiple communicating processors, and/or specially configured hardware.

The security co-processor 510, in response to executing the embedded instructions 522, can implement security features for an electronic device that incorporates the security co-processing system 500. For example, the security co-processor 510 can retrieve rules 524 from the memory system 520 via the memory interface 512, receive monitored communication 515 from a component of the electronic device via an interconnect interface 514, compare the monitored communication 515 to the rules 524, and selectively initiate a security action 516 when the monitored communication 515 fails to conform to the rules 524.

The security co-processor 510 also can receive rules 524 from another location, such as a rules database internal or external to the electronic device, for example, when specified in the embedded instructions 522. The rules 524 received from the rules database can utilized by the security co-processor 510 to implement the security features as well as utilized to update the rules in the memory system 520. The security co-processor 510 can monitor communication or messages from a variety of components, systems, or sub-systems in an electronic device, for example, by coupling to at least on interconnect in the electronic device and listening to traffic sent over the interconnect. The security co-processor 510 can transmit the security action 516 to one or more components in the electronic device, which prompts the components in the electronic device to perform an action, such as shut down, reverse a previous action, log an event within the security action 516, forward or transmit the event to an external server, or the like.

Referring to FIG. 5B, the security co-processing system 530 including a security co-processor 540 is similar to the security co-processing system 500 including the security co-processor 510 with the following differences. The security co-processor 540 can be set in an active interrogating configuration, for example, in response to embedded instructions 523 from a memory system 520 via a memory interface 520.

The security co-processor 540, in response to executing the embedded instructions 523, can implement security features for an electronic device that incorporates the security co-processing system 530. For example, the security co-processor 540 can receive rules 524 from the memory system 520 via the memory interface 512, transmit an interrogation message 545 on an interconnect in the electronic device via an interconnect interface 544, listen for a response message 546 from at least one component of the electronic device via the interconnect interface 544, compare the response message 546 or lack thereof to the rules 524, and selectively initiate a security action 547 when the response message 546 or lack thereof fails to conform to the rules 524. In some embodiments, the response message 546 can fail to conform to the rules 524 when a component transmitting the response message 546 to the security co-processor 540 is not authorized to couple to or utilize the interconnect in the electronic device, when the component should not have been transmitted the response message 546 in response to the interrogation message 545, or when a format, semantics, or syntax of the response message 546 corresponds to illegal communication in response to the interrogation message 545. The lack of a response message 546 in response to the interrogation message 545 also can fail to conform to the rules, for example, when the rule specify a component in the electronic device should transmit a response message 546 in response to the interrogation message 545.

The security co-processor 540 also can receive rules 524 from another location, such as a rules database internal or external to the electronic device, when specified in the embedded instructions 523. The rules 524 received from the rules database can utilized by the security co-processor 540 to implement the security features as well as utilized to update the rules in the memory system 520. The security co-processor 540 can transmit the security action 547 to one or more components in the electronic device, which prompts the components in the electronic device to perform an action, such as shut down, reverse a previous action, log an event within the security action 547, forward or transmit the event to an external server, or the like.

Figure 6:
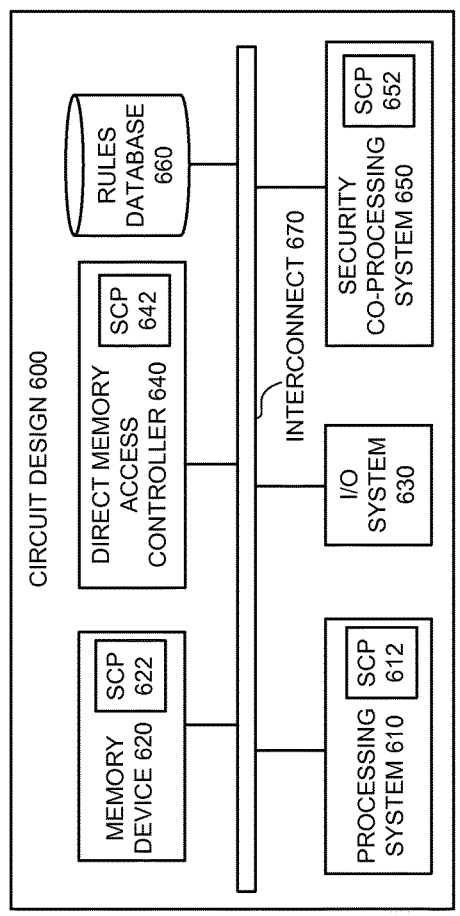
FIG. 6 illustrates another example circuit design including nested security co-processing systems according to various examples of the invention.

FIG. 6 illustrates another example circuit design including nested security co-processing systems according to various examples of the invention. Referring to FIG. 6, the circuit design 600 can describe an electronic device at one or more different levels of abstraction, for example, modeling the electronic device at a register transfer level (RTL), a gate-level, a transistor-level, or the like. The circuit design 600 can describe various electrical components, systems, or sub-systems interconnected to form the electronic device. For example, the descriptions of the electrical components, systems, or sub-systems can include descriptions of a processing system 610, a memory device 620, an input/output (I/O) system 630, a direct memory access (DMA) controller 640, or the like, which can be coupled via an interconnect 670. The interconnect 670 can describe a single bus, multiple busses, an interconnect fabric, or the like, which can variously couple to the electrical components, systems, or sub-systems. The descriptions of the processing system 610, the memory device 620, the input/output (I/O) system 630, and the direct memory access (DMA) controller 640 can model an exchange of messages, communication, data, or the like, with each other over the interconnect 670 in order to perform functionality in a specification for the electronic device.

The circuit design 600 can describe a security co-processing system 650 to provide security features to the electronic device modeled by the circuit design 600 similarly to how the security co-processing system 450 provides security features to the electronic device modeled by the circuit design 400 detailed above referencing FIG. 4. The circuit design 600, however, includes additional nested security co-processing systems 612, 622, 642, and 652, which can provide similar security features to the electronic device as the security co-processing system 650, but by monitoring different, although possibly overlapping, sets of one or more components, systems, or sub-systems, in the circuit design 600.

The processing system 610 can include a nested security co-processing system 612, which can monitor operations of the processing system 610 and issue security actions in response to a divergence between those monitored actions and rules, for example, from a rules database 660. The memory device 620 can include a nested security co-processing system 622, which can monitor operations of the memory device 620 and issue security actions in response to a divergence between those monitored actions and rules, for example, from the rules database 660. The direct memory access (DMA) controller 640 can include a nested security co-processing system 642, which can monitor operations of the DMA controller 640 and issue security actions in response to a divergence between those monitored actions and rules, for example, from the rules database 660. The security co-processing system 650 can include a nested security co-processing system 652, which can monitor operations of the security co-processing system 650 and issue security actions in response to a divergence between those monitored actions and rules, for example, from the rules database 660.

The security co-processing system 650 along with each of these nested security co-processing systems 612, 622, 642, and 652 can operate independently from each other, or they can be configured to coordinate with each other to monitor operations and coordinate security actions. For example, the security co-processing system 650 and the nested security co-processing systems 612, 622, 642, and 652 can communicate with each other via the interconnect 670 or other routing medium available in the electronic device. When the security co-processing system 650 and the nested security co-processing systems 612, 622, 642, and 652 operate independently of each other, in some embodiments, they can still act in concert via an external device or server. For example, the security co-processing system 650 and the nested security co-processing systems 612, 622, 642, and 652 can utilize an external logging functionality, for example, by issuing security actions that log monitored events with one or more external devices, such as a server system or other computing system, allowing the one or more external devices to analyze monitored information from the distributed network of security co-processing systems 612, 622, 642, 650, and 652, and prompt the security co-processing system 650 and the nested security co-processing systems 612, 622, 642, and 652 to take a concerted action.

Figure 7:
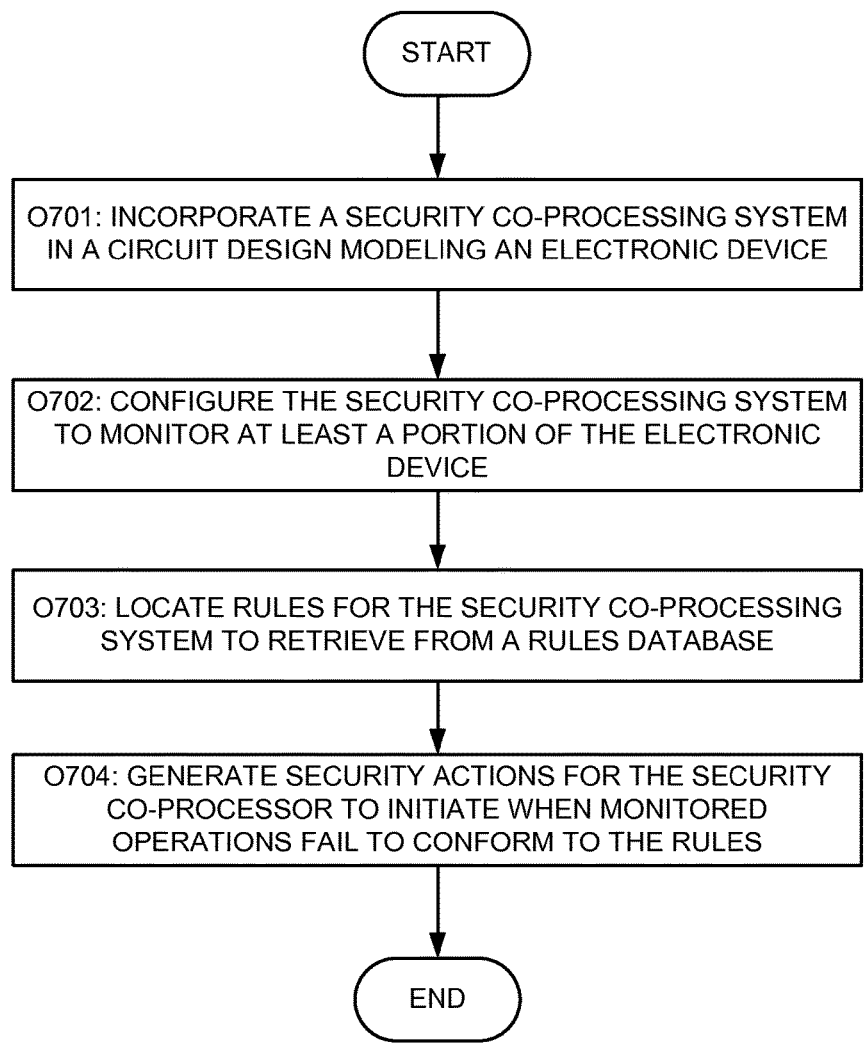
FIG. 7 illustrates an example flowchart implementing inclusion of a security co-processing system in a circuit design according to various embodiments of the invention.

FIG. 7 illustrates an example flowchart implementing inclusion of a security co-processing system in a circuit design according to various embodiments of the invention. Referring to FIG. 7, in a block 701, an electronic design automation tool can incorporate a security co-processing system in a circuit design modeling an electronic device. In some embodiments, the electronic design automation tool can couple the security co-processing system to an interconnect or other communication routing structure within the electronic device modeled by the circuit design.

In a block 702, the electronic design automation tool can configure the security co-processing system to monitor at least a portion of the electronic device. In some embodiments, the electronic design automation tool can generate instructions that, when executed by the security co-processing system, cause the security co-processing system to monitor at least the portion of the electronic device. The electronic design automation tool can configure the security co-processing system to monitor the electronic device in various ways, for example, specify which portions of the electronic device to monitor and how to monitor those portions. For example, the electronic design automation tool can configure the security co-processing system to monitor the electronic device passively or actively. For passive monitoring, the security co-processing system can be configured to listen to traffic or communication on a bus or other interconnect in the electronic device. In active monitoring or an interrogation mode, the security co-processing system can be configured to initiate communication on the bus or other interconnect in the electronic device in an attempt to elicit a response from device or electrical components coupled to the bus or interconnect.

In a block 703, the electronic design automation tool can locate rules for the security co-processing system to retrieve from a rules database. In some embodiments, the electronic design automation tool can generate instructions for the security co-processing system that identify a location of rules. The instructions, when executed by the security co-processing system, can cause the security co-processing system to retrieve the rules from a rules database or other memory device internal or external to the electronic device.

In a block 704, the electronic design automation tool can generate security actions for the security co-processor to initiate when monitored operations fail to conform to the rules. In some embodiments, the electronic design automation tool can generate instructions that, when executed by the security co-processing system, can cause the security co-processing system to be able to issue security actions in response to a deviation from the rules. The security actions can range from shutting down operation of at least a portion of the electronic device down to logging the monitored activity that fails to conform with the rules. In some embodiments, the security actions can include blocking from illegal activity or issuing a security interrupt to reverse any effects of the illegal activity. The security actions can include transmitting a logged activity to an external device, such as a security server or the like, via a network interface of the electronic device. The security actions also can include prompting presentation of the logged activity, for example, via one or more input/output (I/O) devices associated with the electronic device.

Figure 8:
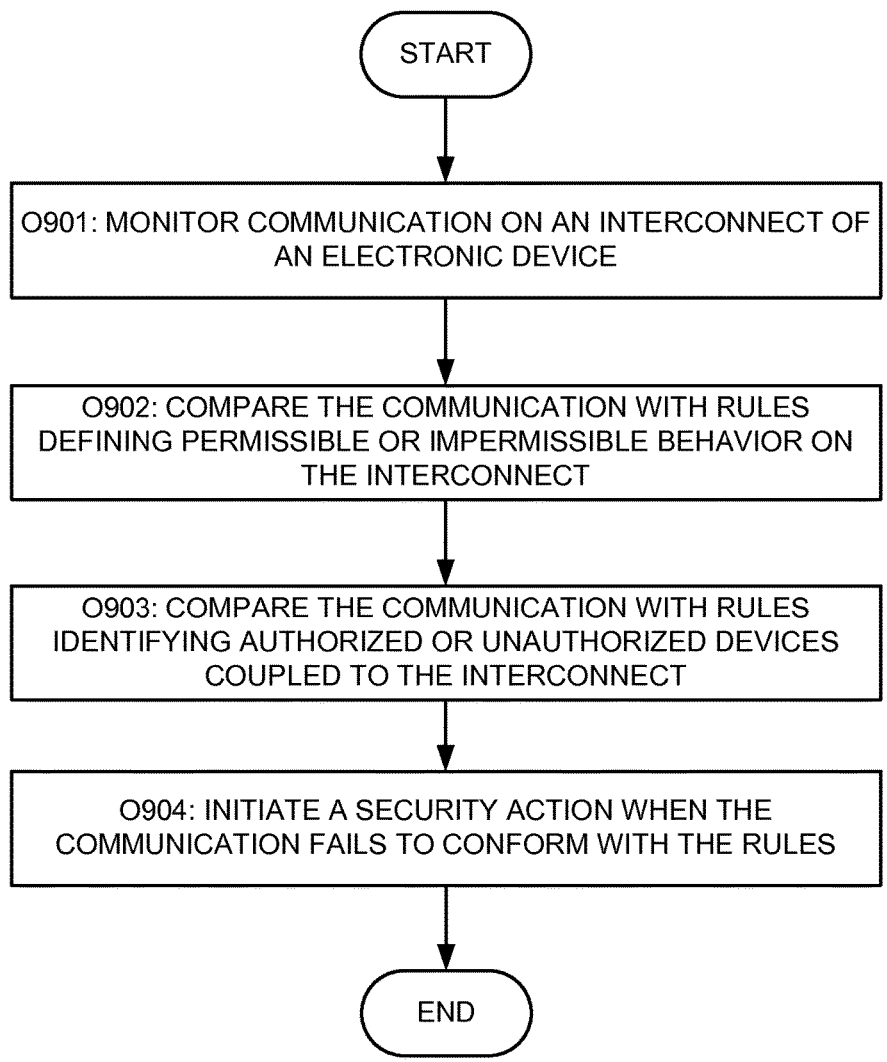
FIG. 8 illustrates an example flowchart implementing a security co-processing system in an electronic device according to various embodiments of the invention.

FIG. 8 illustrates an example flowchart implementing a security co-processing system in an electronic device according to various embodiments of the invention. Referring to FIG. 8, in a block 801, a security co-processor can monitor communication on an interconnect of an electronic device. In some embodiments, the security co-processor can passively monitor traffic or other signaling on the interconnect, for example, by virtue of being coupled to the interconnect. In other embodiments, the security co-processor can actively issue interrogation messages over the interconnect, intended to prompt a response from devices or components coupled to the interconnect. The security co-processor can monitor the interconnect for the responses to the interrogation messages.

In a block 802, the security co-processor can compare the communication with rules defining permissible or impermissible behavior on the interconnect. The rules can define expected activity for components or sub-systems within the electronic device. For example, the rules can indicate whether messaging by components in the electronic device follows expected protocols, syntax, or semantics of legal communication on an interconnect in the electronic device. The rules also can define impermissible behavior for components or sub-systems within the electronic device. The rules can expressly or explicitly disallow certain messaging on or coupling to the interconnect. The rules can indicate whether components provide and receive clock signaling, enable signaling, a reset signaling, interrupts, power supplies, such as voltage or current signals, or the like, within a specification for the electronic device.

In a block 803, the security co-processor can compare the communication with rules identifying authorized and unauthorized devices coupled to the interconnect. The rules can define which devices can be present in the electronic device, which devices cannot be present in the electronic device, how they can couple or connect to other components in the electronic device, how they cannot couple or connect to other components in the electronic device, and how they respond or cannot respond to various stimuli, such as request or interrogation messages.

In a block 804, the security co-processor can initiate a security action when the communication fails to conform with the rules. The security actions can range from shutting down operation of at least a portion of the electronic device down to logging the monitored activity that fails to conform with the rules. In some embodiments, the security actions can include blocking the illegal activity or issuing a security interrupt to reverse any effects of the illegal activity. The security actions can include transmitting a logged activity to an external device, such as a security server or the like, via a network interface of the electronic device. The security actions also can include prompting presentation of the logged activity, for example, via one or more input/output (I/O) devices associated with the electronic device.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
    incorporating, by a computing system, a security co-processor into a circuit design modeling an electronic device;
    configuring, by the computing system, the security co-processor to monitor messages on an interconnect transmitted by an electronic component in the electronic device; and
    loading, by the computing system, one or more rules defining permissibility of the monitored messages on the interconnect in the electronic device, wherein the security co-processor is configured to utilize the rules to identify the monitored messages on the interconnect correspond to an unauthorized operation performed by the electronic component in the electronic device.

2. The method of claim 1, further comprising defining, by the computing system, at least one security action for the security co-processor to initiate when the security co-processor monitors the electronic device failing to conform to the rules.

3. The method of claim 1, wherein incorporating the security co-processor into the circuit design includes coupling the security co-processor to the interconnect in the electronic device, and wherein configuring the security co-processor further comprises configuring the security co-processor to monitor activity on the interconnect in the electronic device.

4. The method of claim 3, further comprising configuring, by the computing system, the security co-processor to determine whether the monitored activity on the interconnect corresponds to the unauthorized operation by the electronic component in the electronic device based on the rules.

5. The method of claim 1, further comprising configuring, by the computing system, the security co-processor to present interrogation messages on the interconnect of the electronic device, wherein configuring the security co-processor further comprises configuring the security co-processor to monitor the interconnect for responses to the interrogation messages.

6. The method of claim 5, further comprising configuring, by the computing system, the security co-processor to determine whether the responses to the interrogation messages or lack thereof conform to the rules.

7. The method of claim 1, further comprising:
    configuring, by the computing system, the security co-processor with a location of a rules database; and
    configuring, by the computing system, the security co-processor to retrieve the rules from the location associated with the rules database.

8. A system comprising:
    a memory system configured to store computer-executable instructions; and
    a computing system, in response to execution of the computer-executable instructions, is configured to:
        incorporate a security co-processor into a circuit design modeling an electronic device;
        configure the security co-processor to monitor messages on an interconnect transmitted by an electronic component in the electronic device; and
        load one or more rules defining permissibility of the monitored messages on the interconnect in the electronic device, wherein the security co-processor is configured to utilize the rules to identify the monitored messages on the interconnect correspond to an unauthorized operation performed by the electronic component in the electronic device.

9. The system of claim 8, wherein the computing system, in response to execution of the computer-executable instructions, is further configured to define at least one security action for the security co-processor to initiate when the security co-processor monitors the electronic device failing to conform to the rules.

10. The system of claim 8, wherein the computing system, in response to execution of the computer-executable instructions, is further configured to:
    couple the security co-processor to the interconnect in the electronic device; and
    configure the security co-processor to monitor activity on the interconnect in the electronic device.

11. The system of claim 10, wherein the computing system, in response to execution of the computer-executable instructions, is further configured to configure the security co-processor to determine whether the monitored activity on the interconnect corresponds to the unauthorized operation by the electronic component in the electronic device based on the rules.

12. The system of claim 8, wherein the computing system, in response to execution of the computer-executable instructions, is further configured to:
    configure the security co-processor to present interrogation messages on the interconnect of the electronic device; and
    configure the security co-processor to monitor the interconnect for responses to the interrogation messages.

13. The system of claim 12, wherein the computing system, in response to execution of the computer-executable instructions, is further configured to configure the security co-processor to determine whether the responses to the interrogation messages or lack thereof conform to the rules.

14. An apparatus comprising at least one computer-readable memory device storing instructions configured to cause one or more processing devices to perform operations comprising:
    incorporating a security co-processor into a circuit design modeling an electronic device;
    configuring the security co-processor to monitor messages on an interconnect transmitted by an electronic component in the electronic device; and
    loading one or more rules defining permissibility of the monitored messages on the interconnect in the electronic device, wherein the security co-processor is configured to utilize the rules to identify the monitored messages on the interconnect correspond to an unauthorized operation performed by the electronic component in the electronic device.

15. The apparatus of claim 14, wherein the instructions are configured to cause one or more processing devices to perform operations further comprising defining at least one security action for the security co-processor to initiate when the security co-processor monitors the electronic device failing to conform to the rules.

16. The apparatus of claim 14, wherein the instructions are configured to cause one or more processing devices to perform operations further comprising:
   coupling the security co-processor to the interconnect in the electronic device; and
   configuring the security co-processor to monitor activity on the interconnect in the electronic device.

17. The apparatus of claim 16, wherein the instructions are configured to cause one or more processing devices to perform operations further comprising configuring the security co-processor to determine whether the monitored activity on the interconnect corresponds to the unauthorized operation by the electronic component in the electronic device based on the rules.

18. The apparatus of claim 14, wherein the instructions are configured to cause one or more processing devices to perform operations further comprising:
   configuring the security co-processor to present interrogation messages on the interconnect of the electronic device; and
   configuring the security co-processor to monitor the interconnect for responses to the interrogation messages.

19. The apparatus of claim 18, wherein the instructions are configured to cause one or more processing devices to perform operations further comprising configuring the security co-processor to determine whether the responses to the interrogation messages or lack thereof conform to the rules.

20. The apparatus of claim 14, wherein the instructions are configured to cause one or more processing devices to perform operations further comprising:
   configuring the security co-processor with a location of a rules database; and
   configuring the security co-processor to retrieve the rules from the location associated with the rules database.

\* \* \* \* \*